Jan. 26, 1937.   W. D. MEYERS   2,068,887
TIRE CHAIN APPLYING TOOL
Filed Oct. 11, 1935
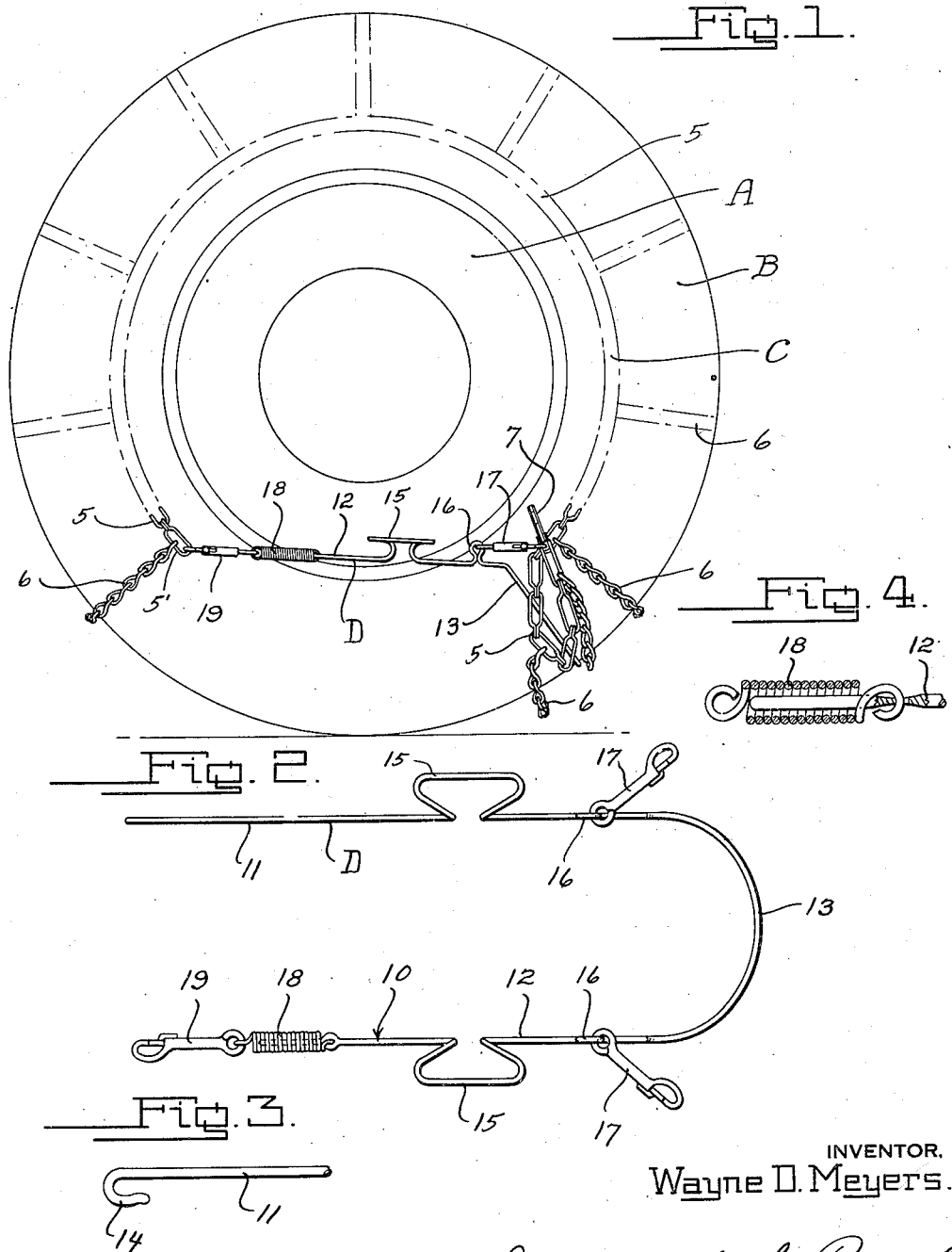
INVENTOR.
Wayne D. Meyers.
BY Lancaster, Allwine and Rommel
ATTORNEYS.

Patented Jan. 26, 1937

2,068,887

UNITED STATES PATENT OFFICE 2,068,887

TIRE CHAIN APPLYING TOOL

Wayne D. Meyers, Harrisburg, Pa., assignor of one-third to Merle E. Coover, Carlisle, Pa.

Application October 11, 1935, Serial No. 44,604

9 Claims. (Cl. 152—14)

The present invention relates to a tool or device for use in applying anti-skid chains to the tires of vehicle wheels and the primary object of the invention is to provide a tire chain applying tool whereby tire chains may be easily and quickly applied to the wheels without requiring the wheels to be jacked up and thus permitting chains to be placed on wheels where jacks could not be used as in soft soil, snow or ice.

A further object is to provide a tire chain tool of this character whereby tire chains may be temporarily held in operative relation upon vehicle wheels in a manner to permit movement of the vehicle when stalled in mud or snow.

A further object is to provide a tire chain device of this character which is of such shape as to snugly embrace the tread of the tire so as not to interfere with rotation of the wheel, nor injury to the device thru rotation of the wheel.

A still further object is to provide a tire chain applying tool wherein the loose ends of the chain may be so held as to prevent damage to the wheel or portion of the vehicle adjacent thereto while the wheel is revolving.

Other objects and advantages of the invention will be apparent from the following detailed description, taken in connection with the accompanying drawing forming a part of this specification and in which drawing:—

Figure 1 is a plan view of a pneumatically tired vehicle wheel showing the improved tool in use for securing an anti-skid chain in place on the wheel.

Figure 2 is a top plan view of the tool.

Figure 3 is a fragmentary view of one end portion of one of the tool arms.

Figure 4 is an enlarged fragmentary sectional view showing the manner of connecting the coil spring to one of the tool arms.

Referring to the drawing in detail and wherein like reference characters designate corresponding parts thruout the several views, the letter A designates a vehicle wheel provided with the tire B upon which the anti-skid chain C is secured in operative position by the improved chain applying tool D.

The anti-skid chain C is of usual construction and comprises a pair of side chains, one of which is shown at 5, connected at spaced apart points by cross chains 6. One end of each of the side chains 5 is provided with a connector 7 and these connectors are adapted for connection to the end links 5' for securing the chain in position about the tire B. Since the chain entirely encircles the tire, the usual practice in applying the chains is to jack the wheel up so that the chain may be placed about the tire. With the improved tool of the present invention, the chain may be applied without requiring the wheel to be jacked up.

The tool D comprises a one piece body portion 10 formed of a round metal rod of suitable strength and bent into substantially U-shape providing a pair of parallel arms 11 and 12 connected at one end by an offset semi-circular or rounded loop 13. This loop 13 as shown in Figure 1 is offset so as to extend in angular relation to the plane of the side arms 11 and 12 whereby this loop snugly embraces the tire when the tool is in use. The outer or free end of the arm 11 is formed into a hook 14 as shown in Figure 3. Formed in each of the arms 11 and 12 is a handle 15 which is upwardly and outwardly offset from the arm so as to provide hand grips whereby the tool may be held in place when attaching the chain thereto. These handles 15 are disposed substantially midway between the ends of the tool and are of such shape as to form slightly yieldable sections in their respective arms as will readily be apparent.

Formed in each of the arms 11 and 12 at a point closely adjacent to the loop 13 is a closed eye 16 formed by looping the metal as shown in Figure 1. Attached to each of the eyes 16 is a chain attaching member in the form of a snap fastener 17 having the usual catch at its free end.

The side arm 12 is of slightly less length than the arm 11 and has secured to its free or outer end portion, a coil spring 18. As clearly shown in Figure 4, the inner end of the spring 18 is connected to the arm 12 at a point spaced inwardly from the end of the arm so that the terminal portion of the arm projects into the spring in a manner to retain the spring in a position longitudinally of the arm. The outer end of the spring is formed with an eye for attachment of a chain attaching member in the form of a snap hook or fastener 19. Thus it will be seen that the spring 18 provides a yielding coupling between the arm 12 and the snap fastener 19.

In using the tool for holding the chain in place upon the wheel, the chain is first placed over the upper side of the tire with the free ends of the chain hanging downwardly over the tire. The operator then grasps the tool by one of the handles 15 and places the tool in straddled relation about the lower portion of the wheel as in Figure 1 and in which position the loop 13 extends radially of the wheel and snugly embraces the tread of the tire B. The end link 5' of one of the side chains 5 is then engaged in the hook 14 and after which the snap 17 on the arm 11 is connected to a suitable link adjacent to the opposite end of this side chain. This secures one of the side chains in position. The snap 17 on the arm 12 is then connected to a suitable link of the other side chain adjacent the end carrying the connector 7 and after which the snap 19 is connected to the end link 5' of this side chain. The spring 18 not only serves to draw the loose ends of the side chains together, but also draws the loop 13 into snug contact with the tread of the tire. The vehicle may then be moved for a short distance until the ends of the chain are brought to an accessible position whereby the tool may be disconnected and the connectors 7 connected to the end links 5'.

If it is desirable, as in the event of advancing a vehicle which may be stalled in mud or snow, to temporarily hold the chain in place upon the wheels, the loose end of the chain may be connected to the snaps 17 as shown in Figure 1 and thereby permit rotation of the wheel without injury to the wheel or any portion of the vehicle adjacent to the wheel being caused by outward swinging of the loose end of the chain.

Thus it will be seen that the construction of the tool is not only such as to permit ready and easy applying of anti-skid chains to vehicle wheels without requiring the wheel to be jacked up, but also permits of the chain being temporarily held in place when such becomes necessary. When the tool is in place upon the wheel, it will cause no interference to proper rotation of the wheel, nor is the tool apt to become broken or distorted in any way owing to the manner in which the tool snugly embraces the tire.

Changes in details may be made to the shape, size and arrangement of parts without departing from the spirit of the invention or the scope of the following claims.

I claim:

1. A tire chain applying tool comprising a body member embodying side arms and a loop connecting the arms at one end for snugly embracing the tire, chain engaging means adjacent each end of each arm, and a handle offset outwardly on each arm.

2. A tool for applying tire chains to vehicle wheels, comprising a body member having parallel side arms for positioning at opposite sides of the wheel and a loop for snugly embracing the tread of the tire and extending radially of the wheel, and chain attaching means adjacent each end of each side arm.

3. A tire chain applying tool comprising a one piece U-shaped body member providing parallel side arms and a loop offset to the plane of the side arms, a looped handle formed in each side arm, and a chain engaging means on each arm at opposite sides of the handle thereon.

4. A tire chain applying tool comprising a U-shaped body member providing parallel side arms and a loop connecting the arms at one end, a chain attaching means on each arm adjacent the loop, a chain attaching means at the free end of each arm, and a yieldable coupling between one of the arms and the chain attaching means at the free end thereof.

5. A tire chain applying tool comprising a U-shaped body member providing side arms and a tire engaging loop, a snap fastener on each arm adjacent the loop, a hook at the free end of one arm, a coil spring secured at one end to the free end of the other arm, and a snap fastener secured to the other end of said spring.

6. A tire chain applying tool comprising a U-shaped body member providing parallel side arms and a tire engaging loop offset at an angle to the major plane of the body member, an eye formed in each arm adjacent to the loop, a snap fastener attached to each eye, a hook formed at the free end of one of the arms, a snap fastener at the free end of the other arm, and a yieldable coupling in said last mentioned arm.

7. A tire chain applying tool comprising a U-shaped body member formed of a single piece of round metal rod providing a pair of parallel side arms and a loop offset in angular relation to the arms, an eye formed in each arm adjacent said loop, a snap fastener attached to each eye, a handle formed in the intermediate portion of each arm, a hook formed on the free end of one of the arms, and a snap fastener yieldably connected to the free end portion of the other arm.

8. A tire chain applying tool comprising a body member embodying parallel side arms and a loop connecting the arms at one end, tire chain attaching means adjacent each end of each arm, and a yieldable connection between the chain attaching means of one arm.

9. A tire chain applying tool comprising a U-shaped body member providing side arms and a loop offset in angular relation to the arms, a snap fastener on each arm adjacent said loop, a hook at the free end of one arm, a coil spring connected at one end to the other arm with the end portion of the arm extending into the spring, and a snap fastener connected to the other end of the spring.

WAYNE D. MEYERS.